United States Patent [19]
Reinders

[11] Patent Number: 6,037,028
[45] Date of Patent: Mar. 14, 2000

[54] PRELAMINATE

[75] Inventor: Johannes Antonius Maria Reinders, Warnsveld, Netherlands

[73] Assignee: Sallmetall B.V., Raalte, Netherlands

[21] Appl. No.: 08/936,385

[22] Filed: Sep. 25, 1997

[51] Int. Cl.$^7$ ...................................................... B32B 7/04
[52] U.S. Cl. ............................ 428/40.1; 40/630; 40/661; 40/661.09; 283/72; 283/74; 283/75; 283/77; 283/81; 283/98; 283/101; 283/103; 428/41.7; 428/41.8; 428/42.2; 428/43; 428/192; 428/194
[58] Field of Search .................................. 428/41.8, 41.7, 428/42.2, 43, 192, 194; 283/74, 75, 72, 77, 81, 98, 101, 103; 40/1.5, 630, 661, 661.09

[56] References Cited

U.S. PATENT DOCUMENTS

| | | | |
|---|---|---|---|
| Re. 31,729 | 11/1984 | Giulie et al. | 156/366 |
| 3,153,868 | 10/1964 | Jones | 428/41.8 |
| 3,874,979 | 4/1975 | Hannon | 161/6 |
| 4,243,458 | 1/1981 | Giulie | 156/247 |

FOREIGN PATENT DOCUMENTS

| | | |
|---|---|---|
| 2561576 | 9/1985 | France . |
| 9302292 | 7/1995 | Netherlands . |
| 9632247 | 10/1996 | WIPO . |

*Primary Examiner*—Nasser Ahmad
*Attorney, Agent, or Firm*—Webb Ziesenheim Logsdon Orkin & Hanson, P.C.

[57] ABSTRACT

A prelaminate has a plurality of layers intended for collective insertion in a mutually fixed spatial relation into the pinch between optionally heated, co-acting pressure rollers. The prelaminate includes a carrier layer, a first glue layer arranged thereon and adhered thereto, a cover foil, for instance of transparent material, such as PET, PVC or the like, and a second glue layer arranged thereon and adhered thereto. The two glue layers are directed toward each other. The layer have straight leading edges which are positioned above each other and are held in this registered position by a registering device. A rejecting device is used to prevent mutual adhesion between the two glue layers. The carrier layer with the first glue layer and the cover foil with the second glue layer, with the exception of the leading edges with the registering device, can be moved apart to receive therebetween a flat object for arranging fixedly and thus for encapsulating therebetween, for instance a sheet carrying information, such as an image and/or text, and carrying through the pressure rollers the layers with the flat object received therebetween for forming a laminate by means of glueing therewith.

13 Claims, 4 Drawing Sheets

PRELAMINATE

BACKGROUND OF THE INVENTION

The invention relates to the encapsulating of a flat object, for instance a plastic foil or a sheet of paper on which information is arranged, such as an image and/or text. Use is usually made for this purpose of a device which comprises two drivable pressure rollers pressed toward each other, which during driving press together a plurality of layers, including the relevant object, for instance a carrier plate, a cover foil, glue layers and further desired layers, optionally with a certain heating. A fixed unit of the different layers is thus formed by glueing, in which the object for encapsulating is wholly incorporated in a laminate.

The known art has the drawback that manually placing onto each other of different objects and foils and inserting thereof into the pinch of the rollers is difficult, since at least the leading edges thereof must be precisely registered. When registering is incorrect there is the danger that for instance an expensive pre-manufactured photograph for encapsulating is rendered useless and has to be replaced.

The invention has for its object to offer provisions having the purpose of obviating the described problems of the known art.

SUMMARY OF THE INVENTION

In respect of this objective the invention provides a prelaminate, comprising a plurality of layers intended for collective insertion in a mutually fixed spatial relation into the pinch between optionally heated, co-acting pressure rollers, which prelaminate comprises:
   a carrier layer;
   a first glue layer arranged thereon and adhered thereto;
   a cover foil, for instance of transparent material, such as PET, PVC or the like, and
   a second glue layer arranged thereon and adhered thereto;
which two said glue layers are directed toward each other;
which said layers have straight leading edges which are positioned above each other and are held in this registered position by registering means;
rejecting means to prevent mutual adhesion between the two glue layers;
this such that the carrier layer with the first glue layer and the cover foil with the second glue layer, with the exception of the leading edges with the registering means, can be moved apart to receive therebetween a flat object for arranging fixedly and thus for encapsulating therebetween, for instance a sheet carrying information, such as an image and/or text, and carrying through said pressure rollers the said layers with the flat object received therebetween for forming a laminate by means of glueing therewith.

Depending on the type, these registering means are more or less visible in the manufactured laminate. Particularly in the case where the registering means are visible and adversely affect the quality of the outward appearance of the laminate, an embodiment is recommended in which the registering means are removable after forming of the laminate.

This variant can have the special feature that the carrier layer with the first glue layer and/or the cover foil with the second glue layer is provided with a weakening zone, respectively are provided with two mutually registered weakening zones, such that after forming of the laminate the leading edges can be removed jointly with the registering means.

A specific embodiment has the characteristic that the glue layers are each of the thermally-activated type and are mutually non-adhesive in cold state. In this embodiment the fact that the glue layers are only activated in the case of temperature increase can be deemed as the rejecting means, which anyway have the function, otherwise than for the final forming of a laminate, of preventing the two glue layers from having an adhesive, in particular a mutually adhesive action.

Yet another embodiment has the special feature that the glue layers are each of the pressure-sensitive type and the prelaminate comprises a protective leaf forming the rejecting means, for instance a foil siliconized on two sides, which protective leaf is placed removably between the glue layers. It will be apparent that under certain conditions it may be considered a slight drawback that the protective leaf must be removed before the object for encapsulating is placed between the glue layers. The advantage of the use of a pressure-sensitive glue is however that heating means for heating the rollers can in principle be omitted. It is noted that when a pressure-sensitive glue type is used it is sometimes difficult to prevent an object for encapsulating already adhering to a glue layer before it reaches its correct position. In this sense a glue of the thermally-activated type could be advantageous.

A specific embodiment has the special feature that the registering means comprise glueing means mutually adhering the said layers.

This embodiment can specifically be adapted such that the leading edges are mutually connected by means of a glue layer forming the registering means and extending in the manner of a writing pad substantially transversely of the leading edges. Another embodiment has the special feature that the cover foil or the carrier layer is folded over the leading edges of the other layers and connected thereto by glue.

In an embodiment in which the registering means are embodied as a weld connection between the layers, which weld connection is formed by heating the leading edge zone and subsequently causing cooling thereof, the use of glueing means can be dispensed with.

In a last embodiment the prelaminate according to the invention has the special feature that the carrier layer is provided with a third glue layer arranged thereon and adhered thereto for adhering the prelaminate or the laminate to a surface, for instance a stiff carrier plate. It is noted in this latter respect that it is not unusual to cut the laminate exactly to size after forming thereof, by means of for instance a sharp knife or other cutting means.

BRIEF DESCRIPTION OF THE DRAWINGS

The invention will now be elucidated with reference to the annexed drawings. In these drawings.

DESCRIPTION OF THE PREFERRED EMBODIMENTS

Figure 1:
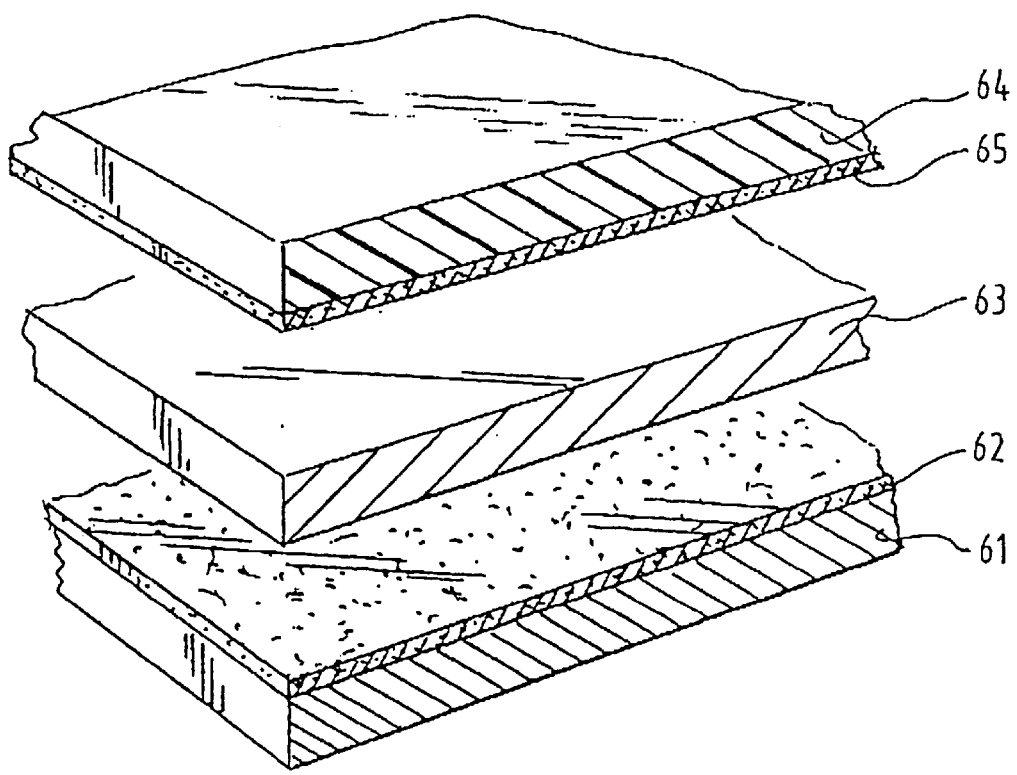
FIG. 1 shows a perspective view of a plurality of layers for arranging onto each other as according to the prior art.

FIG. 1 shows a carrier layer 61 which is provided with a glue layer 62. An image carrier 63 has to be placed thereon which in turn is covered by a transparent PET foil 64 with interposing of a glue layer 65. By making use of for instance the device 1 shown in FIGS. 5 and 6, the layers of the configuration shown in FIG. 1 are placed in a through-feed operation into coaction under pressure and, subject to the type of glue used, by supplying heat, in order to obtain a laminate 66 as finished product. This finished product 66 comprises a carrier layer, for instance a plastic foil, or a carrier plate of plastic, plastic with foam core or aluminium with a thickness of for instance 0.1–10 mm. The first glue layer 62 can have a thickness for instance of 10–20 $\mu$m. The image carrier 63 can have a thickness in the order of 75–125 $\mu$m. The second glue layer 65 also has a thickness of for instance 10–20 $\mu$m. The foil cover layer 64 can very suitably have a thickness of for instance 75–125 $\mu$m.

Figure 2:
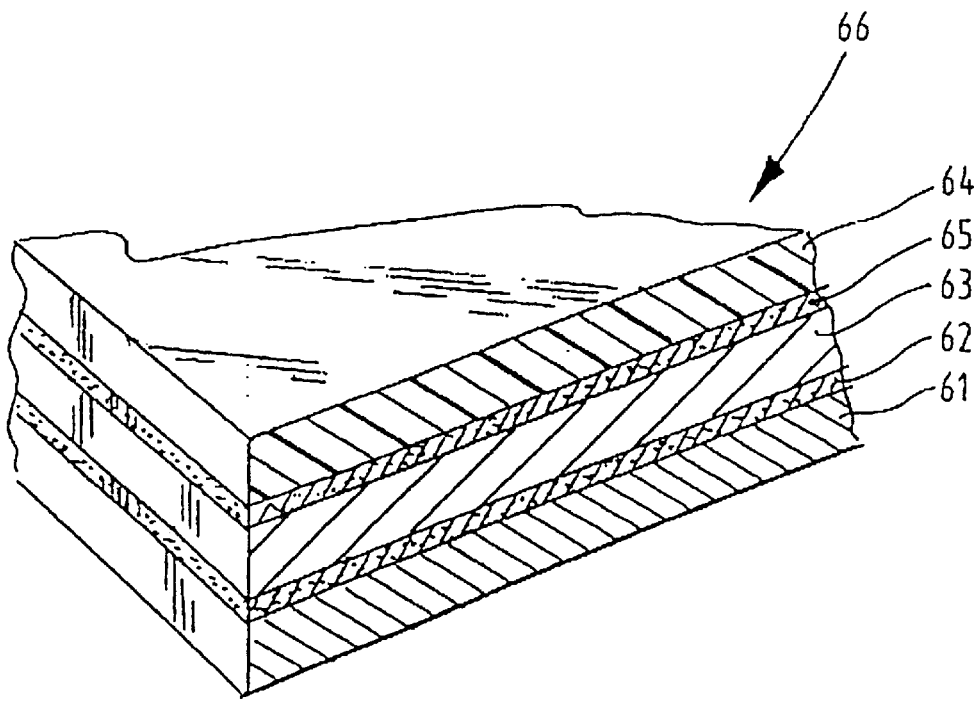
FIG. 2 shows a view corresponding with FIG. 1 of a laminate as finished product, obtained with the prelaminate or assembly according to FIG. 1.
Figure 3:
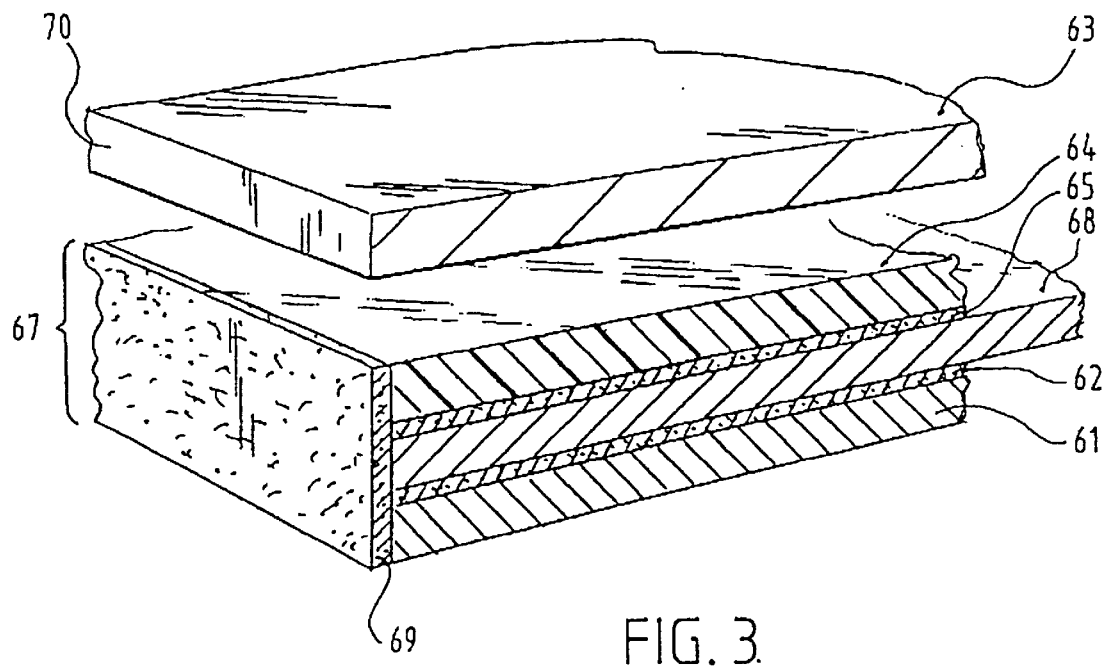
FIG. 3 shows a view corresponding with FIG. 1 of a prelaminate according to the invention and an image carrier for placing into co-action therewith.

FIG. 3 shows a prelaminate 67 according to the invention. In this embodiment the first glue layer 62 and the second glue layer 65 are of the pressure-sensitive type and for this reason separated in this prelaminate 67 by a protective layer 68. Before the image carrier 63 is arranged between glue layers 62 and 65 to form the finished product in the form of a laminate corresponding by and large with the laminate 66 according to FIG. 2, the protective leaf 68 is removed, this by first placing carrier layer 61 with first glue layer 62 at a distance from cover foil 64 with second glue layer 65. In this manner the protective leaf 68 can be released for removal. The protective leaf comprises for instance a paper or plastic foil provided with a silicone layer on both sides. By removing protective leaf 68 the glue layers 62 and 65 are left clear, whereby image carrier 63 can be placed against the registering glue layer 69 which in the manner of a writing pad mutually connects the layers 61, 62, 64, 65 at the leading edges adjacent to this glue layer 69 and thus holds these layers in register. After removal of protective leaf 68 the prelaminate 67 is "folded open" and the image carrier 63 can be placed with its leading edge 70 against the glue layer 69. With glue layer 69 as front the thus resulting semi-manufacture is introduced into a laminating/encapsulating device 1 as according to FIGS. 5/6. The glue layer 69 is first to be placed into contact with pressure rollers 4, 5. During through-feed an adhesion occurs between the various layers with interposing of the glue layers 62 and 65.

In order to enable easy removal of protective leaf 68 it can advantageously have a portion protruding outside layers 61, 62, 65, 64 on the side remote from the glue layer 69. Herewith a user can easily effect a separation between protective leaf 68 and glue layers 62, 65.

The glue layers 62 and 65 are of the pressure-sensitive type. For this embodiment of the prelaminate according to the invention the rollers do not have to be provided with heating means for activating the glue layers.

It is noted that, for the sake of clarity, the various layer thicknesses are not shown to scale.

Figure 4:
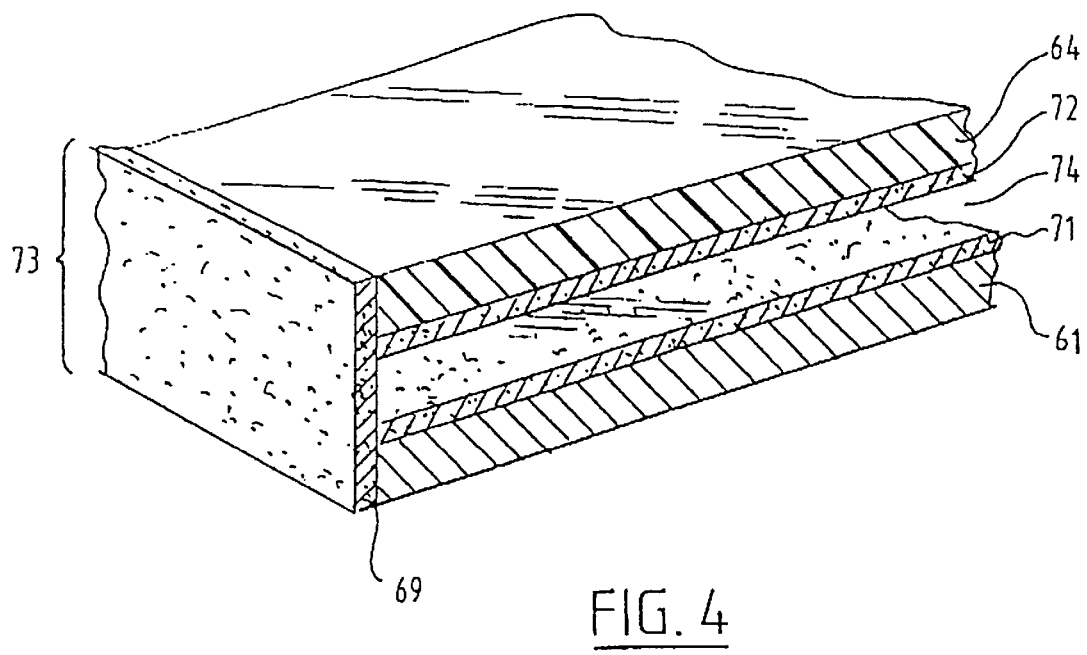
FIG. 4 shows a second embodiment of a prelaminate according to the invention in a view corresponding with FIG. 1.

FIG. 4 shows an embodiment in which glue layers 71, 72 functionally corresponding with the pressure-sensitive glue layers 62, 65 according to FIG. 3 are of the heat-activated type. The existence of a certain space 74 between these layers is designated symbolically. It will otherwise be apparent that in practice the prelaminate 73 is supplied in this embodiment such that the layers 71, 72 lie on top of one another. In this embodiment according to FIG. 4 a protective foil does not have to be present, since glue layers 71, 72 are only activated by heat. In this embodiment the image carrier 63 therefore only has to be inserted into the space 74 by folding open the laminate, i.e. moving apart the parts 61, 71 and 64, 72 such that the leading edge 70 of image carrier 63 comes to lie against the registering glue layer 69. Other than in the prelaminate according to FIG. 3, use must be made of two pressure rollers and heating means added thereto, for instance the heating elements 24, 25 shown in FIG. 6, in order to form the finished product, wherein the layers of the laminate are fully adhered to one another. Alternatively, the rollers may be of the heated type.

It is noted that it can be advantageous according to the invention that a user does not have to touch with the fingers the for instance wholly transparent cover layer 64. It will be apparent that fingerprints may adversely effect the quality of the finished product. In this respect the PET foil 64 can for instance be provided on the side remote from glue layer 69 with a lightly adhesive tab, with which the prelaminate 73 according to FIG. 4 can be folded open in the described manner for receiving therein image carrier 63. The relevant tab can subsequently be removed as desired, without the user having left fingerprints on the finished product.

Figure 5:
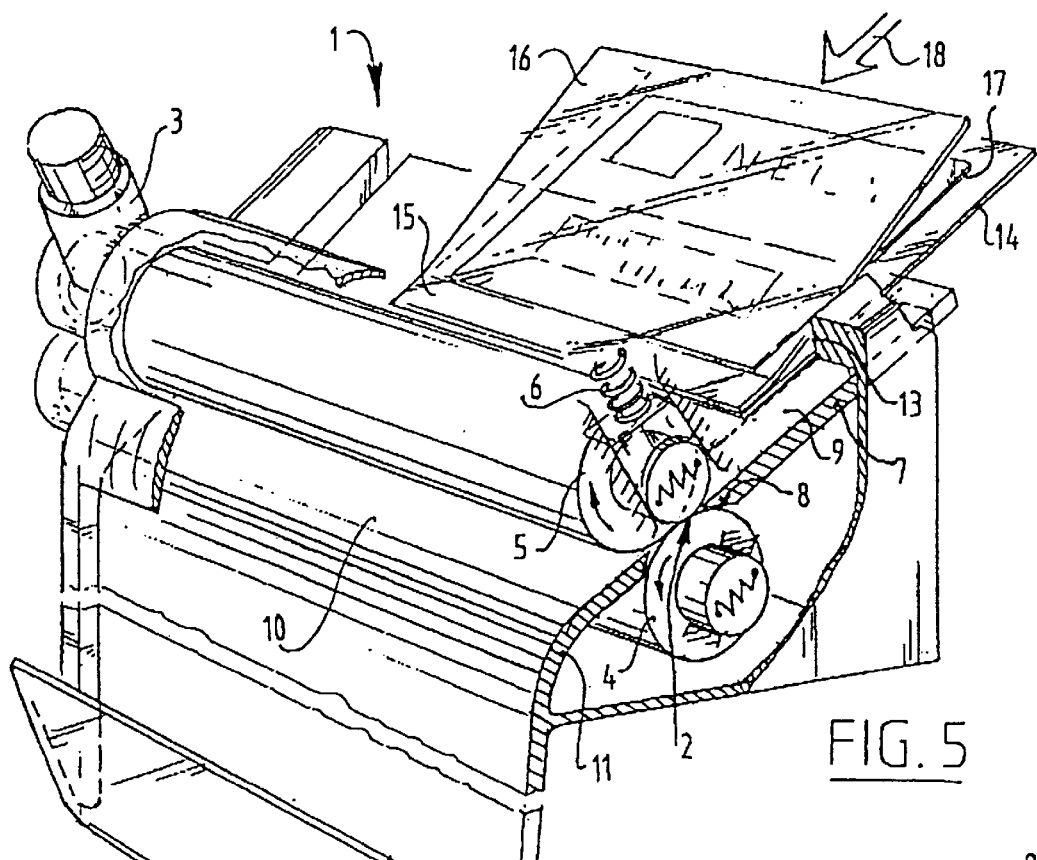
FIG. 5 is a partly broken-away perspective view of a device with which an object can be encapsulated in a prelaminate according to the invention.

FIG. 5 shows a device 1 in a first embodiment of the invention.

The device 1 comprises two rollers 4, 5 driven by a motor 3 and together defining a horizontal pinch 2. The lower roller 4 is mounted round a fixed axis, while roller 5 is pressed toward roller 4 by pressure springs 6.

Connecting onto the infeed side of pinch 2 is a flat feed plate 7. The forward edge 8 thereof takes a form adapted to the form of the lower roller 4 whereby the upper surface 9 of feed plate 7 is situated at least roughly at the height of pinch 2.

As shown in FIG. 5, the feed plate 7 is disposed at an angle of inclination varying from the horizontal position of about 40° such that the pinch 2 is situated at the lower end of feed plate 7. The imaginary flat plane through the mutually parallel rotation axes of rollers 4 and 5 extends substantially perpendicularly of the upper surface 9 of feed plate 7.

A discharge plate 10 connects onto the outfeed side of pinch 2. The part of discharge plate 10 adjoining the pinch 2 is flat and connects via a smoothly curving part 11 onto a collecting tray 12.

The rollers 4, 5 are heated in order to process layers which have to be mutually adhered by means of heat-activated adhesive layers prearranged on these layers.

As shown in FIG. 5, a carrier plate 14 is pushed along a side guide 13 toward the pinch 2 over the upper surface 9 of feed plate 7. Via a leading edge 15 a transparent cover foil 16 is adhered to carrier plate 14. Prior to feeding through pinch 2, this foil 16 is lifted up in order to place a sheet 17 carrying visual information onto the carrier plate 14 such that the leading edge of this sheet 17 lies against the leading edge 15. The combination 14, 17, 16 is then moved in the direction of arrow 18 so as to be transported through pinch 2.

It is noted that the motor 3 can drive rollers 4, 5 continuously. In that case the leading edge 15 may only be arranged in the pinch after positioning of sheet 17.

In another embodiment the drive rollers 4, 5 are not yet driven during a preparatory phase. In this phase the leading edge 15 can be placed against the pinch, which automatically results in a correct parallel positioning, whereafter the foil 16 is folded upward, the sheet 17 placed and the drive of rollers 4, 5 actuated.

Figure 6:
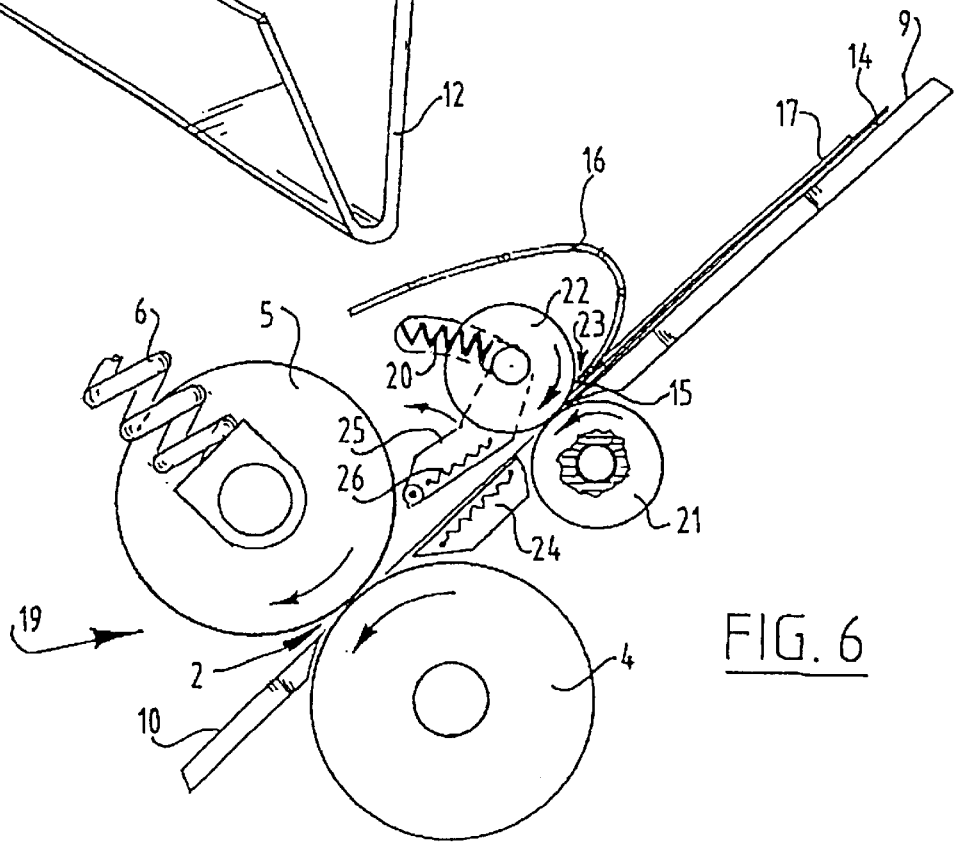
FIG. 6 shows a schematic side view of a variant for the purpose of elucidating the invention.

FIG. 6 shows highly schematically a device 19 in a second embodiment of the invention. This embodiment comprises in addition to rollers 4, 5 two infeed rollers, respectively a lower infeed roller 21 and an upper infeed roller 22, which are pressed toward each other by spring means 20. These together bound a pinch 23. Extending between the pinches 23 and 2 are a stationary heating element 24 and a heating element 26 present in a supporting arm 25 for infeed roller 22.

In FIG. 5 the cover foil 16 is drawn for the sake of clarity such that it is only lifted up over a limited height. FIG. 6 shows the above described, most practical method of operation. In this embodiment the foil 16 is folded wholly back in order to leave the upper surface of carrier plate 14 completely clear.

The device 19 is embodied such that the rollers 4, 5 are driven continuously. The infeed rollers 21, 22 can be driven as required by the user, whereby in the stationary situation of the rollers 21, 22 the pinch 23 can function as registering stop. After positioning of sheet 17 the drive of the rollers 21, 22 can be actuated.

Figure 7:
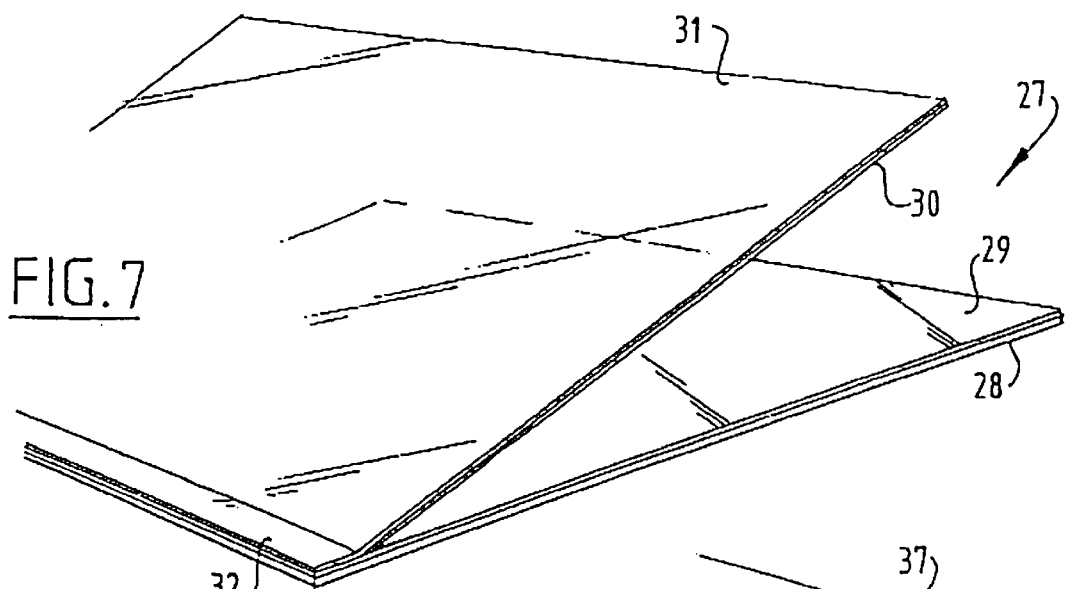
FIGS. 7, 8 and 9 are perspective views of three different combinations of a carrier and a cover foil adhered thereto with a leading edge.

FIG. 7 shows in the lifted position a combination 27 consisting of respectively a carrier 28, a polyethylene layer 29, a polyethylene layer 30 and a transparent cover foil 31. The layers 29 and 30 are fused together along a leading edge 32 by a heating treatment. The polyethylene layers 29 and 30 serve as heat-activated adhesive layers.

Figure 8:
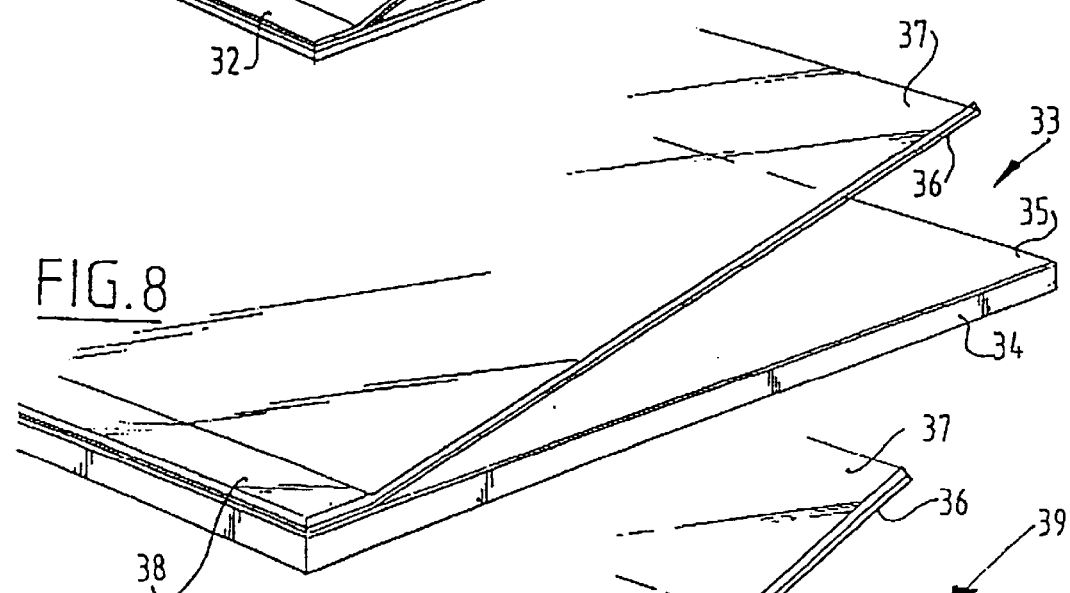

FIG. 8 shows a combination 33 consisting of respectively a cardboard carrier 34, an adhesive layer 35, an adhesive layer 36 and a transparent cover foil 37. The adhesive layers 35 and 36 can be of any suitable type. In the case where these are of pressure-sensitive type they must be separated from each other by a non-adhesive protective or separation foil, for instance a silicone or waxed paper, prior to use in the device according to the invention.

The adhesive layers 35, 36 are mutually adhered along a leading edge 38.

Figure 9:
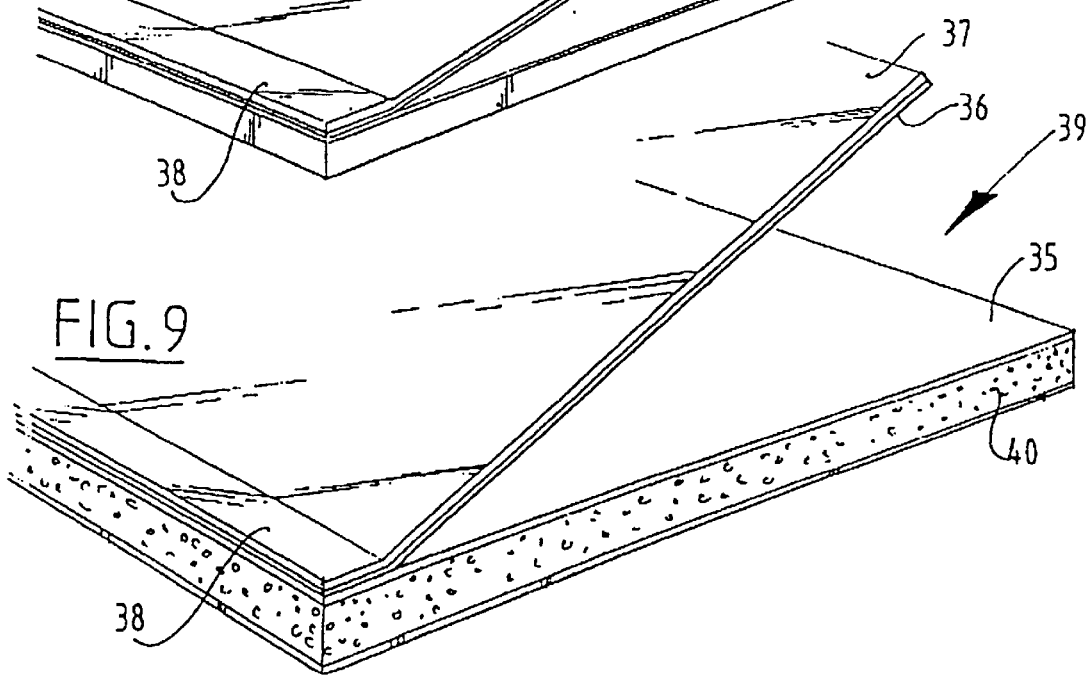

Finally, FIG. 9 shows a combination 39 comprising a carrier plate 40 of foam material, the adhesive layer 35 adhered thereto, the adhesive layer 36 and the transparent cover foil 37 to which adhesive layer 36 is adhered. In the region of the leading edge 38 the adhesive layers 35, 36 are pre-adhered to each other.

The devices 1 and 19 are capable of accommodating different thicknesses of combinations for processing in that the rollers are pressed toward each other under spring load. The largest thickness to be accommodated can lie for instance in the order of 20–40 mm. The width of the rollers determines the largest width of a combination which can be accommodated. The device can for instance be designed such that it can handle dimensions up to the standardized format A0. This is however a matter of freedom in design and subject to the wishes of a user.

It is noted that the invention is not limited to the embodiments drawn and described with reference to the drawings. The carrier layer can for instance consist of a relatively stiff plate of cardboard or a sandwich structure with at least one skin plate and a foam core. This carrier layer and/or the cover foil can be provided with one respectively two mutually registered weakening zones. The leading edge zone, including the registering means, can thus be removed by means of a finishing process after forming of the laminate. A relatively deep cut can for instance be made in the carrier plate parallel to the collective leading edges. Along this cut the leading edge of the carrier plate can be broken off. A cut can then be made in the remaining layers, for instance with a sharp knife, such that they are cut off cleanly along the edge.

As alternative or in combination an outer layer can be folded over the leading edges of the other layers and can even extend via a subsequent fold over the edge zone of the oppositely directed surface. Use can also be made of a separate foil element which mutually adheres the relevant leading edges. As a final alternative, a fusing of the various layers can take place by temporarily heating the collective leading edges. The drawback of such a process is that the thus obtained edge zone generally has an appearance which is not very attractive and is therefore preferably removed after forming of the laminate. In the case of another type of registering means, in particular when an end edge of the cover foil is folded over the relevant other layers, a finishing process in the form of removing the registering means is generally not necessary.

It is noted generally in respect of the registering means that they do not necessarily have to extend along the entire length of the leading edge zone, but that for instance two or more adhesive zones placed at a mutual distance can suffice.

I claim:

1. A prelaminate comprising a plurality of layers for collective insertion in a mutually fixed spatial relation into the pinch between co-acting pressure rollers, which prelaminate comprises:

a carrier layer;

a first glue layer arranged on the carrier layer and adhered thereto;

a cover foil;

a second glue layer arranged on the cover foil and adhered thereto, wherein the two glue layers are directed toward each other;

wherein each of the above layers have substantially straight and mutually aligned leading edges and said layers being sequentially stacked in superimposed position over each other and are held in this registered position by registering means; and rejecting means for preventing mutual adhesion between the two glue layers and separates said glue layers, such that the carrier layer with the first glue layer and the cover foil with the second glue layer, with the exception of the leading edges with the registering means, are movable apart to receive therebetween a flat object for arranging fixedly and thus for encapsulating therebetween and carrying through the pressure rollers the layers with the flat object received therebetween for forming a laminate by means of glueing therewith, wherein the registering means includes a fourth glue layer mutually adhering each of the layers together, and wherein the leading edges of each of said layers are mutually connected together by said fourth glue layer forming the registering means and extending substantially transversely of and along the leading edges.

2. The prelaminate as claimed in claim 1, wherein the registering means are removable after forming of the laminate.

3. The prelaminate as claimed in claim 2, wherein at least one of the carrier layer with the first glue layer and the cover foil with the second glue layer is provided with a weakening zone are such that after forming of the laminate the leading edges can be removed jointly with the registering means.

4. The prelaminate as claimed in claim 1, wherein the glue layer are each thermally-activated and are mutually non-adhesive in cold state.

5. The prelaminate as claimed in claim 1, wherein the glue layer are each pressure-sensitive and the prelaminate comprises a protective leaf forming the rejecting means, which protective leaf is placed removably between the glue layers.

6. The prelaminate as claimed in claim 1, wherein at least one of the cover foil and the carrier layer is folded over the leading edges of the other layers and connected thereto by fourth glue.

7. The prelaminate as claimed in claim 1, wherein the registering means are embodied as a weld connection between the layers, which weld connection is formed by heating a leading edge zone and subsequently causing cooling thereof.

8. The prelaminate as claimed in claim 1, wherein the carrier layer is provided with a third glue layer arranged thereon and adhered thereto for adhering at least one of the prelaminate and the laminate to a surface.

9. The prelaminate as claimed in claim 1, wherein the cover foil includes a transparent material selected from the group consisting of PET and PVC.

10. The prelaminate as claimed in claim 1, wherein the flat object is a sheet carrying information.

11. The prelaminate as claimed in claim 5, wherein the protective leaf is a foil siliconized on both sides.

12. The prelaminate as claimed in claim 8, wherein the surface is a stiff carrier plate.

13. The prelaminate as claimed in claim 3, wherein the carrier layer and the cover foil have two mutually registered weakening zones.

* * * * *